US009037161B1

(12) United States Patent
Azih

(10) Patent No.: US 9,037,161 B1
(45) Date of Patent: May 19, 2015

(54) DEVICE AND METHODS FOR SIGNAL-BROADCASTING SOCKETS

(71) Applicant: Emmanuel Azih, Washington, DC (US)

(72) Inventor: Emmanuel Azih, Washington, DC (US)

(*) Notice: Subject to any disclaimer, the term of this patent is extended or adjusted under 35 U.S.C. 154(b) by 0 days.

(21) Appl. No.: 14/301,054

(22) Filed: Jun. 10, 2014

(51) Int. Cl.
| | |
|---|---|
| *H04W 4/04* | (2009.01) |
| *G01S 5/02* | (2010.01) |
| *H04B 1/38* | (2006.01) |
| *G01S 11/06* | (2006.01) |
| *G01S 1/00* | (2006.01) |
| *G01S 1/02* | (2010.01) |
| *H04W 4/02* | (2009.01) |
| *G01S 1/70* | (2006.01) |
| *G01S 1/68* | (2006.01) |

(52) U.S. Cl.
CPC ............... *G01S 5/0289* (2013.01); *H04B 1/38* (2013.01); *G01S 11/06* (2013.01); *G01S 1/00* (2013.01); *G01S 1/02* (2013.01); *H04W 4/022* (2013.01); *H04W 4/04* (2013.01); *G01S 1/70* (2013.01); *H04W 4/02* (2013.01); *H04W 4/043* (2013.01); *G01S 1/68* (2013.01); *H04W 4/046* (2013.01)

(58) Field of Classification Search
CPC ............... G01S 1/00; G01S 1/02; G01S 1/68; G01S 1/70; G01S 11/06; H04W 4/02; H04W 4/022; H04W 4/04; H04W 4/043; H04W 4/046
USPC ............... 340/539.11, 539.13, 81; 455/456.1, 455/456.3, 457
See application file for complete search history.

(56) References Cited

U.S. PATENT DOCUMENTS

| | | | |
|---|---|---|---|
| 2,934,590 A | 4/1960 | Thompson et al. | |
| 7,528,716 B2 * | 5/2009 | Jackson | 340/539.23 |
| 8,396,485 B2 | 3/2013 | Grainger et al. | |
| 8,621,097 B2 | 12/2013 | Venkatakrishnan et al. | |
| 2005/0186965 A1 * | 8/2005 | Pagonis et al. | 455/456.1 |
| 2009/0174569 A1 * | 7/2009 | Smith et al. | 340/825.49 |
| 2012/0182172 A1 * | 7/2012 | Sorensen | 342/28 |
| 2012/0202531 A1 * | 8/2012 | Killian et al. | 455/457 |
| 2012/0258669 A1 | 10/2012 | Honkanen et al. | |
| 2013/0099920 A1 | 4/2013 | Song et al. | |
| 2013/0281084 A1 * | 10/2013 | Batada et al. | 455/426.1 |

* cited by examiner

*Primary Examiner* — Daniell L Negron
*Assistant Examiner* — Benyam Haile
(74) *Attorney, Agent, or Firm* — Emmanuel C. Azih

(57) ABSTRACT

The present disclosure is directed to an electronic socket device that transmits radio signals, which can be used to approximate the location of a person or device in a room. In one embodiment, the device may be installed in a standard electrical outlet and powered by an AC power source.

20 Claims, 7 Drawing Sheets

400

NOTE Setting the BEACON INTERVAL and/or the TX POWER to a value of zero (0) will tell the beacon to turn off broadcasting.

UUID uuid

MAJOR major numeric field

MINOR minor numeric field

BEACON INTERVAL (ms)

200 duration of each beacon broadcast. numeric field

TX POWER (dB)

-30 transmit power for this broadcast. numeric field. negative integer.

CONNECTION INTERVAL (minutes)

5 number of minutes between beacon check-ins. numeric field

CONNECTION TIMEOUT (minutes)

25 number of minutes to wait for check-in before the "beacon down" email is sent. numeric field. Recommend: value = 3 x Connection-Interval.

Save Options

FIG. 6

DEVICE AND METHODS FOR SIGNAL-BROADCASTING SOCKETS

TECHNICAL FIELD

The present disclosure generally relates to an electronic device and more particularly, to an electronic wall socket or outlet adapted to broadcast radio signals.

BACKGROUND OF THE DISCLOSURE

Determining the exact location of a device or person has increasingly become important to drive location based activities. Several technologies for doing so have resulted from efforts aimed at determining a person's location. For example, satellite-based global positions systems (GPS) provide location based services, provided the device (i.e., receiver) is outdoors. While most of these technologies work well outdoors, they are inaccurate, indoors.

In particular, GPS systems do not work well indoors. In these systems, satellites broadcast signals to enable GPS receivers (i.e., smartphones, mobile devices, etc.) on or near the Earth's surface to determine location and synchronized time. Several factors, however, damage the GPS signal and thus affect accuracy.

For example, signal degradation occurs when the GPS signal is reflected off objects such as tall buildings or large rock surfaces before it reaches the receiver. This increases the travel time of the signal, thereby causing errors.

In addition, buildings, terrain, electronic interference, or sometimes even dense foliage can block signal reception, causing position errors or possibly no position reading at all. Thus, GPS units typically will not work indoors, underwater or underground. Accordingly, there is a need for improved techniques to determine the location of a device or person where standard GPS fails.

The present disclosure addresses the need in the art for such knowledge. Current technologies that attempt to determine the location of a user indoors use devices called beacons.

For example, by tagging a beacon to a particular location, one may determine the location of a receiver indoors based on the receiver's proximity to the beacon.

The beacon works by using Wi-Fi signals, in particular Bluetooth Low Energy (BLE). BLE communication consists of two main parts: broadcasting and connecting.

Broadcasting is a one-way mechanism. Using broadcasting, signal-broadcasting devices or beacons broadcast data to any receiver which may be in listening range, for example, a smart phone in close proximity to the beacon. Devices that broadcast BLE signals, using only the advertising channel, are customarily called beacons. Accordingly, the disclosed signal-broadcasting device represents an improved beacon.

Standard beacons are unreliable and difficult to maintain because they are battery operated, requiring frequent battery replacement. Indeed, a scenario in which a large retail organization deploys 1000 beacons across several parts of a building would result in the inevitable inconvenience of having to replace each battery that eventually dies.

Further, these battery-powered beacons cannot be remotely configured. That is, to change the configurable settings of the beacon (e.g., broadcast range or interval), one must be in close proximity to the beacon to establish a pairing connection. This again represents a challenge in large beacon deployments.

Moreover, these beacons are housed in battery-powered dongles, and/or glued to open surfaces, so they often detract from the physical decor of each installation site and are particularly susceptible to theft. The disclosed embodiments are directed to overcoming one or more of the problems set forth above.

For example, the signal-broadcasting device in the present disclosure may be AC powered, seamlessly integrated to any building without detracting from the buildings original decor, and may be remotely configured via a network (i.e., Internet). Moreover, the mountable features of the signal-broadcasting device make it less susceptible to tamper and theft.

DISCLOSURE SUMMARY

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the disclosure and together with the description, serve to explain the principles, set forth.

Further, the device may include a circuit board and a power circuit that delivers power to the circuit board, the transmitter, or a sensor.

In one embodiment, the device may include a processor that receives configuration information from a remote device and a memory that stores the configuration information, wherein the radio signals are transmitted according to the configuration information and the configuration information comprises a periodicity value, an identification value, and a signal strength value.

In one embodiment, the power circuit may convert solar power to DC power. Further, in another embodiment, the power circuit may use batteries to deliver power. In yet another embodiment, the power circuit may use AC power from the AC power source to deliver power.

In one embodiment, the electrical device is affixed to a wall. In another embodiment, the device the circuit board or the transmitter may communicate with a device external to the electrical device via power modulation, near-field wireless technology, and/or Wi-Fi. The external device may be a computing device with a Graphical User Interface display that displays data, a mobile device, a second electrical device, or a server.

16. In one embodiment, the electrical device may broadcast Bluetooth Low Energy radio signals.

In one embodiment, the electrical device may receive a configuration file, which may include configuration information, such as a UUID, Major, Minor, signal strength, and broadcast interval of the radio signal.

BRIEF DESCRIPTION OF THE DRAWINGS

In order to describe the manner in which the above recited and other advantages and features of the disclosure can be obtained, a more particular description of the principles briefly described above will be rendered by reference to specific embodiments, which are illustrated in the appended drawings.

Understanding that these drawings depict only exemplary embodiments of the disclosure and are not therefore to be considered to be limiting of its scope, the principles herein are described and explained with additional specificity and detail through the use of the accompanying drawings in which:

FIG. 6 is an example screenshot of the configuration information for a signal-broadcasting socket, consistent with disclosed embodiments.

DESCRIPTION OF THE EMBODIMENTS

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. The present disclosure provides an electrical device in the form of an electrical wall socket that may be mounted in a standard outlet box and configured to broadcast radio signals. In one embodiment, such signals may be Wi-Fi signals and used to determine the proximity of another device or of a person relative to the broadcasting device itself.

Here, the electrical device encompasses an electrical receptacle, outlet, or socket, including an AC fixture having one or more AC sockets customarily installed in a wall using, for example, standard switch and outlet boxes and/or standard wall plates.

The term Wi-Fi encompasses any type of 802.11 network, whether 802.11b, 802.11a, 802.11n, etc. Wi-Fi is further meant to encompass Bluetooth Low Energy (BLE) signals, introduced as part of the Bluetooth 4.0 broadcast specification as a wireless personal area network technology designed and marketed by the Bluetooth Special Interest Group. Thus, the term Wi-Fi is further intended to encompass future versions and/or variations of foregoing communication standards (e.g., Bluetooth 4.1).

Figure 1:
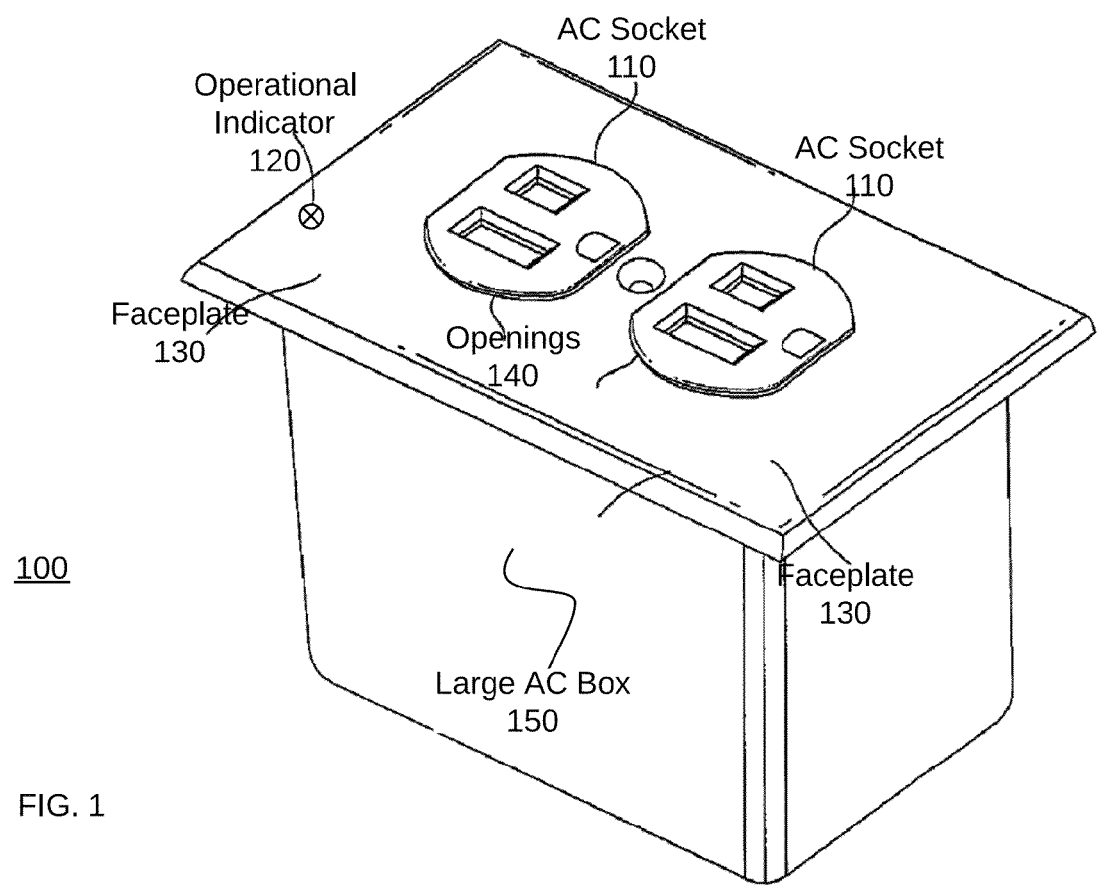
FIG. 1 is a perspective view of a signal-broadcasting socket housed within an AC outlet.

FIG. 1 is a perspective view of a signal-broadcasting device housed within an AC outlet. Signal-broadcasting device 100 may advertise/transmit packets of data in regular intervals; this data can be then picked up or "heard" by receivers (e.g., mobile device), triggering a certain action on the receiver.

Specifically, devices that are in range of a signal-broadcasting device 100 may be able to 'hear' the broadcast signal and thus estimate their location very precisely, as well as exchange date with device 100.

As shown in FIG. 1, signal-broadcasting device 100 may be part of a modified AC fixture or wall outlet, such as a standard home or commercial AC outlet for mounting on a wall.

In one embodiment, signal-broadcasting device 100 may have operational indicator 120 mounted to faceplate 130 of the AC fixture.

Faceplate 130 may be mounted atop AC Sockets 110. Faceplate 130 may have openings 140 for AC socket 110 or for operation indicator 120, or both.

Operational indicator 120 may be a Light Emitting Diode or standard light bulb used to visually indicate the operational status of signal-broadcasting device 100.

For example, by flashing different colors of lights or the same color of a light in a predetermined pattern, operational indicator 120 may alert a user of a faulty wiring, communication error, or general operating mode of signal-broadcasting device 100. Thus, a tester circuit (not shown) for detecting a wiring reversal and other installation/configuration errors may be part of the signal-broadcasting device 100.

Other placements of operational indicator 120 and specific types of indicators, (e.g., LEDs, bulbs, sounds, etc.) or components and circuits, supporting those indicators may be devised by a person skilled in the art.

Figure 2:
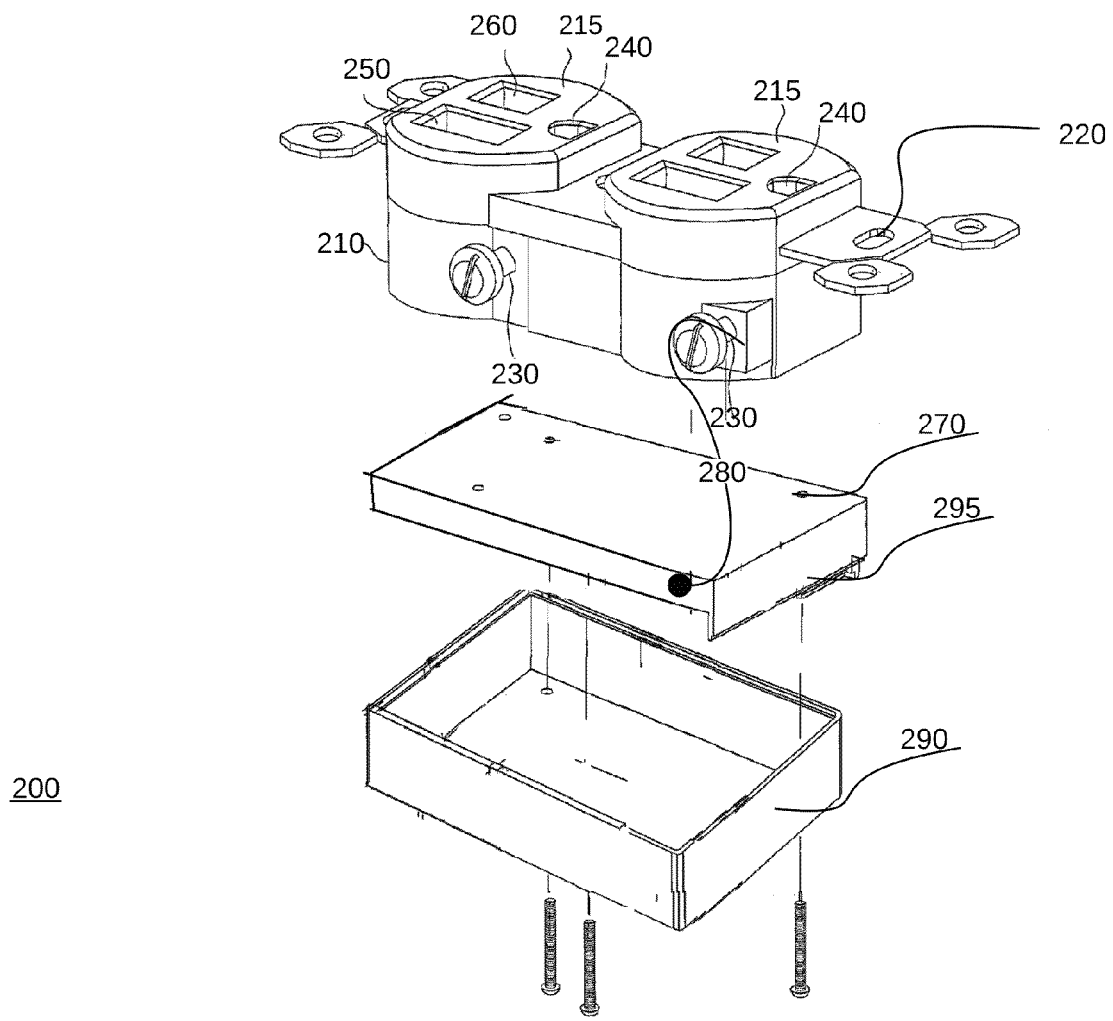
FIG. 2 shows an exploded view of the signal-broadcasting socket of FIG. 1.

FIG. 2 shows an exploded view of signal-broadcasting device 100 of FIG. 1, illustrating internal components.

In one embodiment, signal-broadcasting device 100 may include AC socket block 210, which may be a double socket or duplex or may have a single or other number of sockets.

AC socket block 210 may have mounting holes 220 and terminals 230 for AC wires and at least one three-prong (or two-prong) AC socket 215 for receiving a standard plug.

Rounded hole 240 in a three-prong AC socket 215 may be connected to earth ground and receive the rounded prong of the standard three-prong plug.

The longer of the two rectangular slots 250 in the three-prong AC socket 215 may be connected to the neutral wire and the shorter of the two rectangular slots 260 in a three-prong AC socket 215 may be connected to the line voltage (i.e., "hot" wire or terminal).

In one embodiment, earth ground, neutral, or line wires from the household AC wiring may be connected to both AC socket block 210 and circuit board 270. For example, a ground wire 280 may connect from the circuit board 270 to neutral connection 230 of the AC socket block 210.

Circuit board 270 may have circuit traces and any mounting for electronic components (not shown), including power circuits, antenna circuits, Wi-Fi circuits, etc. Circuit board 270 may also include multiple circuit boards, sub boards, circuitry and components known in the art to broadcast radio signals.

Circuit board 270 may be enclosed in a housing having an input end for connecting to a three-prong AC socket and an output end for connecting a second device.

In one embodiment, circuit board 270 may be mounted to AC socket block 210. In another embodiment, circuit board 270 may be mounted closer to the longer or neutral-connected slot of the AC socket 210 or to the shorter or hot-connected slot of the AC socket 210. In a further embodiment, circuit board 270 may be affixed to faceplate 130.

For safety reasons, certification bodies (e.g., FCC, UL, etc.) may demand specific mounting requirements; yet, such requirements fall within the spirit of the present disclosure.

In a further embodiment, circuit board 270 may be separately housed to AC socket 210. For example, bottom case 290 may be coupled to top case 295. Circuit board 270 may be mounted to or within the top case 295, bottom case, 290 or to both cases in separate parts. Standard brackets/hooks (not shown) may be used to mount to bottom case 290, circuit board 270 and/or top case 295.

Top case 295, circuit board 270, and bottom case 290 may be then placed inside a small box (not shown). AC socket block 210 may then be placed affixed to the small box. In one embodiment, the small box may be further placed inside large box 150.

Figure 3:
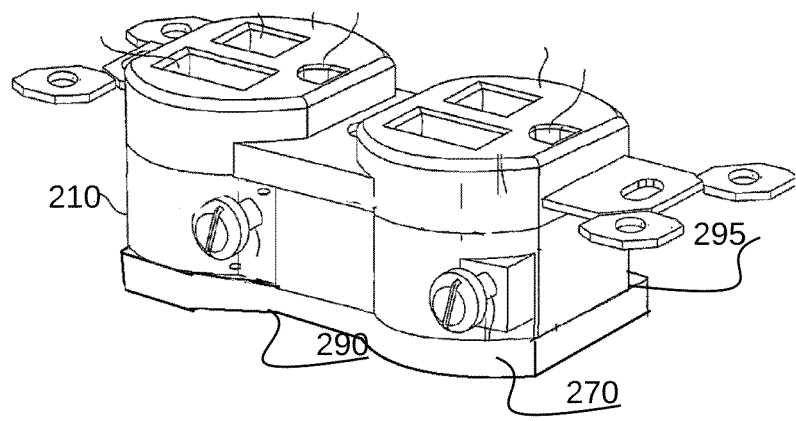
FIG. 3 illustrates an exemplary embodiment of signal-broadcasting socket.

Referencing FIG. 3, large box 150 may not be used, and top case 295, circuit board 270 and bottom case 290 may be adapted to be affixed atop AC socket block 210 and may be placed directly into a wall outlet as such.

Figure 4:
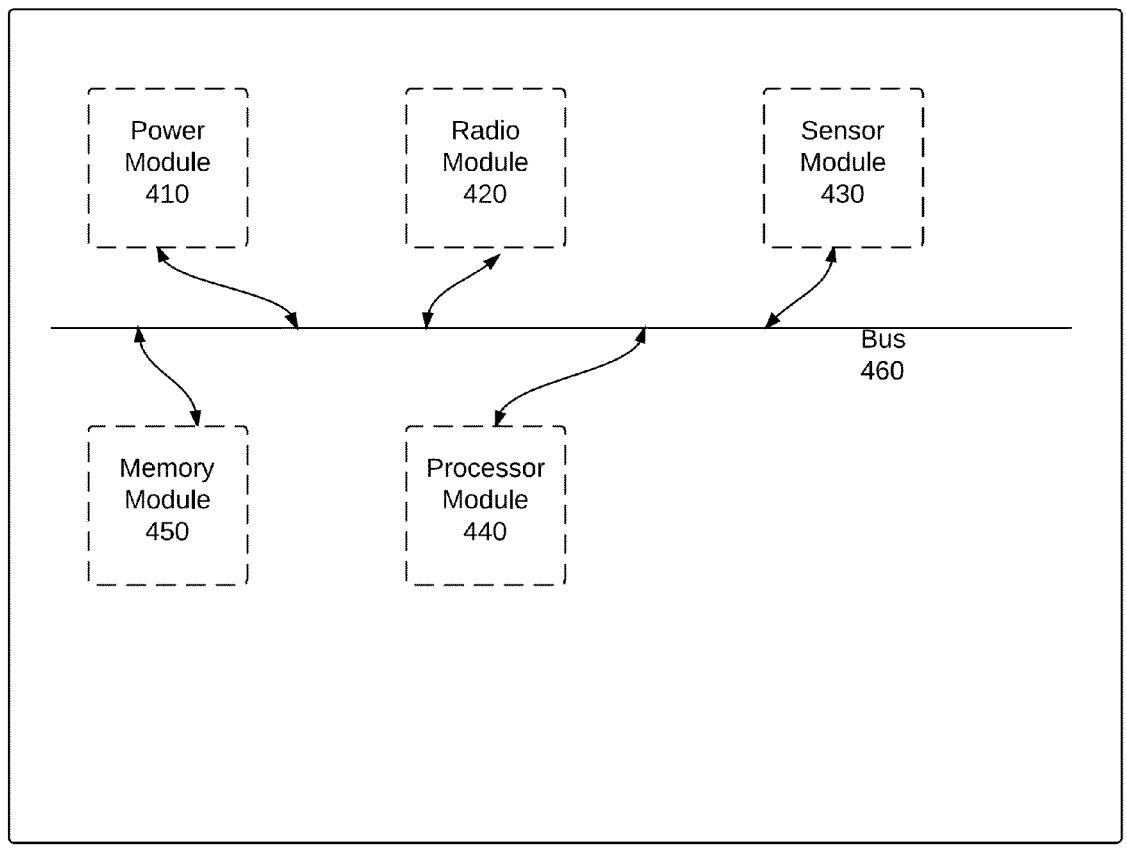
FIG. 4 is a block diagram illustrating an example circuit board for a signal-broadcasting socket, consistent with disclosed embodiments.

Referring now to FIG. 4, which is a block diagram illustrating an example circuit board for signal-broadcasting device 100, consistent with disclosed embodiments, device 100 may include circuitry for a power module 410, a radio module 420, a sensor module 430, a processor module 440, a memory module 450, and a system bus 460 that couples various system modules to each other.

Power module 410 may include circuitry for converting 120V-60 Hz AC, as commonly used in household and business AC wiring to ~5V DC, and supply the DC voltage and current to circuit board 270. Other voltage and power conversions (e.g., solar power to DC), regulation, or generation circuits may be devised by a person of skill in art and the DC voltage supplied to circuit board 270 may vary within standard tolerance limits.

In one embodiment, power module 410 suitable for the powering of circuit board 270 may include a rectifier for rectifying AC voltage to DC voltage as rectified AC voltage, and a regulator for producing a regulated DC voltage from the rectified AC voltage.

Power module 470 may also include smoothing circuitry that reduces the ripple of the rectified AC voltage. The regulator section may regulate the DC voltage from the rectified AC voltage down to a lower DC voltage in a manner known in the art, such as by smoothing and dropping the DC voltage, using a DC to DC voltage conversion or a switching regulator employing a transformer and pulse logic controlled by feedback.

Power module 470 may make use of a transformer to step down the AC voltage to a lower AC voltage at a higher current, followed by rectification and regulation. Power module 470 may rectify the AC voltage directly from the AC connection, followed by rectification and regulation. A transformer may be used to transform the AC voltage or to transform a pulsed DC voltage, as in a switching regulator.

Figure 5:
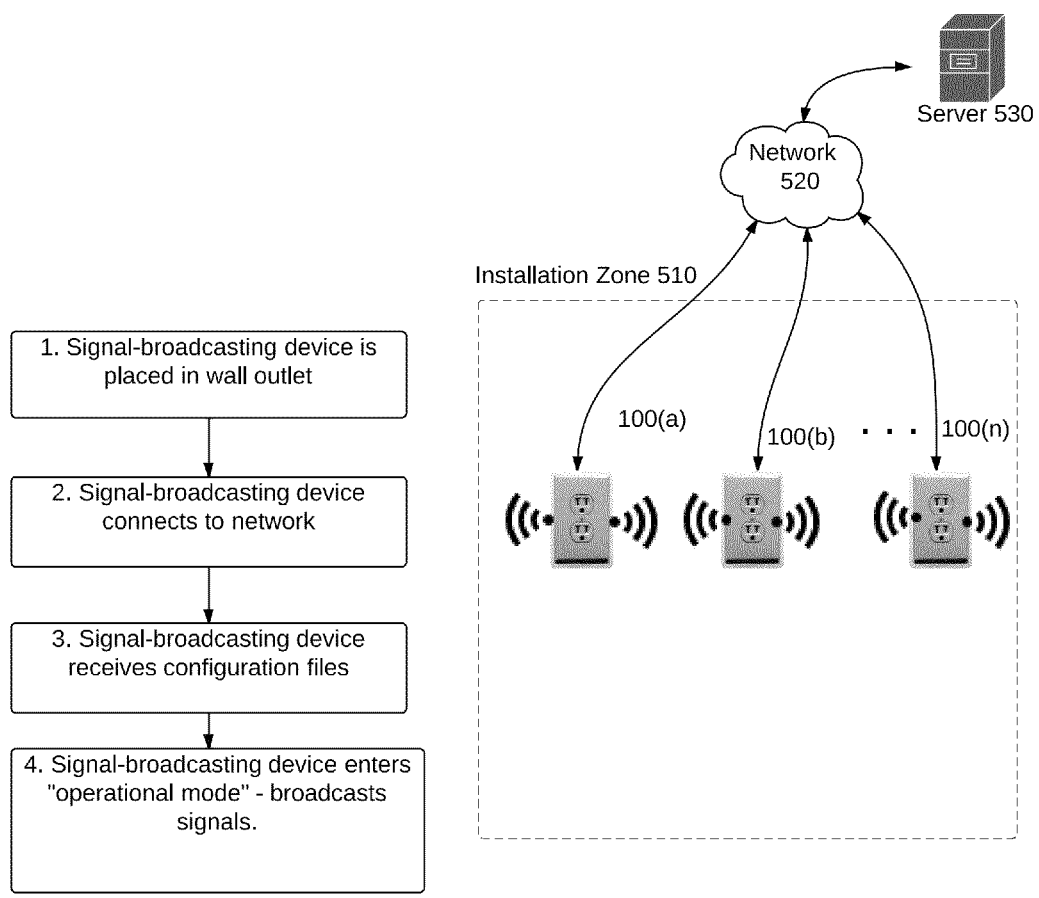
FIG. 5 is a flowchart and diagram illustrating an exemplary installation method of a signal-broadcasting socket, consistent with disclosed embodiments.

Radio module 420, may include circuitry for modules capable of Wi-Fi, Bluetooth, or other wireless or wired communication, including short-range or long-range wireless protocols. In one embodiment, module 420 may be a configured to receive and process data from external devices such as a portable computing device (i.e., smartphone), another signal-broadcasting device, or remote server as indicated in FIGS. 5 and 6.

In a further embodiment, signal-broadcasting device 100 may send and receive data via radio module 420 through the AC wires of the household wiring. That is, circuit board 270 may include circuits for radio module 420 configured to communicate signals and data.

For example, a plurality of signal broadcasting devices 100 may connect to the AC wiring of a building to communicate data to/from each other or to/from a computing device such as a personal computer, mobile device, or remote server.

In order to communicate data over AC wiring, various means may be devised. For example, a data stream may be capacitively coupled to the AC wires at the first signal-broadcasting devicse and modulated over the AC wires, then a capacitively decoupled from the AC wires at the second signal-broadcasting device using suitable coupling and modulation/demodulation circuitry.

The modulation and demodulation may be at the applicable data rates, or may involve up conversion to a higher frequency and down conversion from the higher frequency to the data rate. Suitable filtering to remove the AC line frequency e.g. 60 Hz at the receiving end may be applied, along with data recovery circuitry.

Data or a data stream may be embedded in or include a clock signal, and the clock signal may be recovered at the receiving end by suitable clock recovery circuitry.

Data may be sent directly in a modulated format resembling or related to industry standards albeit at appropriate voltage levels for AC line modulation, or the data may be accompanied by additional network-related packet information or other data so that the AC lines are used as a network.

Collision protocols or circuitry may be included for more reliable communication. Communication may be point to point or have a limited number of specified addresses, or may be generally networked, with appropriate protocols and circuitry included in the proximity-sensing receptacle. Communication maybe unidirectional or bidirectional, and may be simplex, half duplex or full-duplex, make use of time division multiplexing or other multiplexing schemes or known aspects of communication technology.

In addition, other connectors, standards, signals, data, circuitry and ports may be applied and included in the signal-broadcasting device as described above. Indeed, additional data from sensors such as temperature, sound, motion, accelerometers may be communicated among and between signal-broadcasting devices 100, peripherals, and computing devices over AC wiring, Wi-Fi, or standard Bluetooth communication protocols.

Sensor module 430 may include circuitry for modules capable of sensors including motion, sound, light, temperate, and/or acceleration. Other sensors may be devised by a person of skill in art and coupled to signal broadcasting device 100.

Processor module 440 may include may include circuitry for modules configured to general-purpose processors including hardware or software modules configured to control other modules on circuit board 270 as well as a special-purpose processor where software instructions are incorporated into the actual processor design.

Processor module 440 may essentially be a completely self-contained computing system, containing multiple cores or processors, a bus, memory controller, cache, etc. A multi-core processor may be symmetric or asymmetric.

These and other modules can control or be configured to control or support processor 440 to perform various actions. For example, circuitry for memory module 450 may be available for use as well. Memory module 450 may be multiple different types of memory with different performance characteristics.

The present disclosure may operate on a circuit board 270 with more than one modules or on a group or cluster of external computing devices networked together (e.g., System on a Chip) to provide greater processing capability.

System bus 460 may be any of several types of bus structures including a memory bus or memory controller, a peripheral bus, and a local bus using any of a variety of bus architectures. A basic input/output (BIOS) stored in memory 450 or the like, may provide the basic routine that helps to transfer information between modules on the circuit board 270.

Hardware modules of the present disclosure that perform a particular function may include the software component stored in a non-transitory computer-readable medium in connection with the necessary hardware components, such as processor 440, power module 410, bus 460, radio module 420 or sensor module 430.

One or more existing AC sockets may be replaced with signal-broadcasting device 100 as illustrated in FIG. 5. Upon installation in a wall socket (Step 1), signal-broadcasting device 100 may connect to a network (Step 2) and download its configuration information (Step 3). In one embodiment, the configuration information may be pre-loaded into signal-broadcasting device 100 before or during installation.

Signal-broadcasting device 100 may connect to server 530 via network 520 on pre-determined intervals to download updated configuration information or to provide other information (e.g., status).

Network 520 may enable communication between signal-broadcasting device 100 (e.g., 100(*a*), 100(*b*) ... 100(*n*)), and server 530. For example, network 520 include a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Bluetooth, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

Although network 520 is depicted as a single network, it should be appreciated that according to one or more embodiments, network 520 may comprise a plurality of interconnected networks, such as, for example, the Internet, a service provider's network, a cable television network, corporate networks, and home networks.

Moreover, several signal-broadcasting devices 100a-100n may be deployed across several installation zones 510 and may be similarly associated with a physical location within each building.

FIG. 6 is an example screenshot of configuration file or configuration information of signal-broadcasting device 100, consistent with disclosed embodiments. As illustrated, the configuration information may include standard BLE values such as a Universal Unique Identifier (UU ID) that uniquely identifies one or more signal-broadcasting devices 100 as a certain type or from a certain organization; a Major value, that may be used to group signal-broadcasting devices having the same UUID; a Minor value to differentiate signal-broadcasting devices with the same UUID and major value; and a transmission value (RSSI), which may be programmed into each signal-broadcasting device to facilitate determining the distance from the device based on the signal strength of the broadcast signal upon a receiver.

For example, in a restaurant setting, the UUID of a signal-broadcasting device may be assigned to a particular restaurant (e.g., John's Pizza), and major value may be assigned to a group (e.g., John's Pizza on 4th Street) and minor values may be used to group or distinguish multiple signal-broadcasting devices within John's Pizza on 4th street. For example, the minor value may be assigned to a micro location within the restaurant (e.g., bar area). In this manner, several combinations/permutations of UUIDS, major, and minor values may be assigned to any location.

Figure 7:
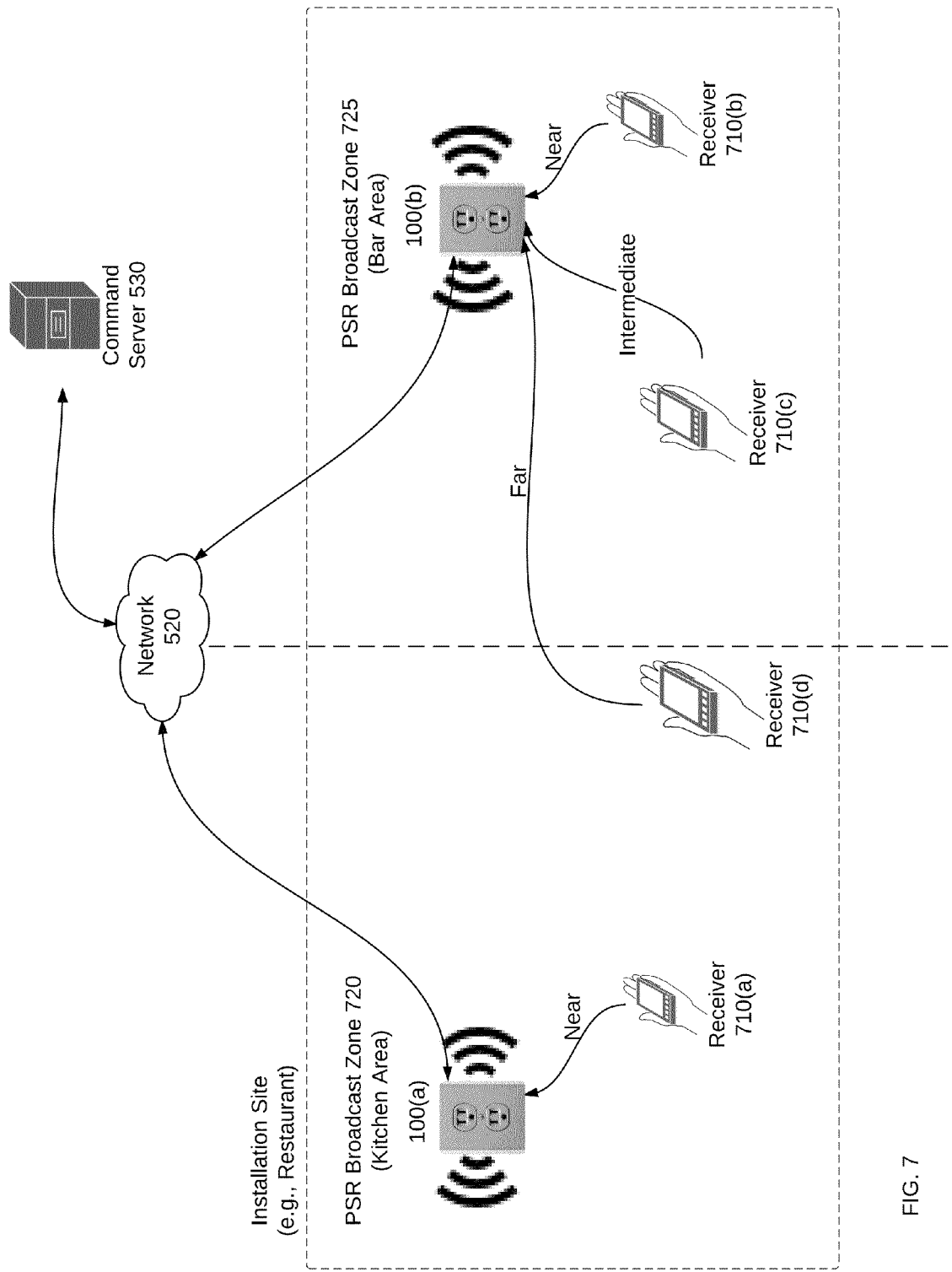
FIG. 7 is a flowchart and diagram illustrating an exemplary implementation method of a signal-broadcasting socket, consistent with disclosed embodiments.

If multiple signal-broadcasting devices are deployed, each associated with a particular entity and a micro location, a computing device such as a smartphone may determine its location with respect to each device based on the signal strength being broadcast illustrated in FIG. 7.

Referring to FIG. 7, signal-broadcasting devices 100(*a*) and 100(*b*) may be configured to receive and process communications from a plurality of receivers, e.g., 710(*a*), 710(*b*), and 710(*c*). The receivers may be personal computers or portable devices and may be in close proximity to devices 100. The range of each device 100 may be set to cover a predetermined radius such that receivers 710 may receive the signal being broadcast. In one embodiment, the radius may be set in the configuration information file.

In a further embodiment, the broadcast zone or radius 720 of device 100(*a*) may be configured to be limited to the dimension of the kitchen area. Whereas broadcast zone 725 of 100(*b*) may be configured to be limited to the bar area. In this manner, the location of any receiver 710 may be accurately determined based on the relative signal strength of the signals being broadcast by devices 100(*a*) and 100(*b*). Thus, an event such as a push notification may be triggered on the receiver based on its proximity or relative proximity (e.g., near, intermediate, or far) to either device 100(*a*) or 100(*b*).

For example, if a receiver 710 is closet to a signal-broadcasting device assigned to a "bar area" of a restaurant (i.e., 100(*b*)), the receiver may trigger an automatic display of the bar's drink menu based on the user's proximity to that signal-broadcasting device. A receiver 710 may be a smartphone or any other device with a graphical user interface or graphical display unit.

The figures illustrate various components (e.g., servers, receivers, processors, etc.) separately. The functions described as being performed at various components may be performed by other components, and the various components or modules may be combined or separated.

Having identified and described various embodiments, aspects and features associated with the signal-broadcasting device of the present disclosure, it is specially noted that each of the disclosed devices may be configured and dimensioned so as to be operatively associated with either an existing standard wall outlet box (e.g., retro construction) or a new wall outlet box (e.g., new construction).

It is noted that in other aspects of the present disclosure, the device may be accommodated by a housing such as disclosed herein or structures of similar construction. Alternative retrofitting techniques may be employed without departing from the spirit or scope of the present disclosure, as will be readily apparent to persons skilled in the art.

Each of the signal-broadcasting devices may incorporate additional structural features and/or functions. For example, ventilation openings may be incorporated into the design of the disclosed devices/systems, to facilitate heat dissipation. The amount of heat generated by the disclosed signal broadcasting devices may vary (e.g., based on the components associated with the disclosed device/system).

Moreover, one may appreciate several placement options of the signal-broadcasting device to achieve maximum radio frequency broadcasting without parting from the spirit and scope of the present disclosure.

Other embodiments of the present disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An electrical wall socket device operative to transmit location information, comprising:
   a receiver operative to receive a configuration information, wherein the configuration information comprises at least two of a UUID, Major, and Minor of a Bluetooth Low Energy signal;
   a transmitter operative to broadcast a one-way communication, wherein the one-way communication comprises at least two of the, UUID, Major, and Minor, of the Bluetooth signal;
   wherein the UUID represents a first location, the Major represents a second location within the first location, and the Minor represents a third location within the second location.

2. The electrical device of claim 1, wherein the electrical socket is connectable to an AC power source.

3. The electrical device of claim 2, comprising:
   a circuit board; and
   a power circuit configured to deliver power to the circuit board and the transmitter or a sensor.

4. The electrical device of claim 3, wherein the sensor comprises at least one of a temperature sensor, a motion sensor, an ambient sensor, and a sound sensor.

5. The electrical device of claim 4, comprising:
   a processor that receives configuration information from a remote device; and
   a memory that stores the configuration information, wherein the radio signals are transmitted according to the configuration information and the configuration information comprises a periodicity value, an identification value, and a signal strength value.

6. The electrical device of claim 5, wherein the power circuit converts solar power to DC power.

7. The electrical device of claim 6, wherein the power circuit uses batteries to deliver power.

8. The electrical device of claim 7, wherein the power circuit uses AC power from the AC power source to deliver power.

9. The electrical device of claim 8, wherein the electrical device is affixed to a wall.

10. The electrical device of claim 9, wherein the circuit board or the transmitter communicates with a device external to the electrical device via at least one of power modulation, nearfield wireless technology, and WiFi.

11. The electrical device of claim 10, wherein the external device is a computing device comprises a display that displays data on a Graphical User Interface.

12. The electrical device of claim 11, wherein the external device is a mobile device.

13. The electrical device of claim 12, wherein the electrical device is a first electrical device and the external device is a second electrical device.

14. The electrical device of claim 13, wherein the external device comprises a server that sends and receives data to and from the circuit board.

15. The electrical device of claim 14, wherein the radio signal is a Bluetooth Low Energy Signal.

16. A method for approximating a location of a receiver, comprising:
   receiving a configuration information, wherein the configuration information comprises at least two of a UUID, Major, and Minor of a Bluetooth Low Energy signal;
   broadcasting a plurality of a one-way communications from a plurality of electrical wall socket devices in a room, wherein the one-way communications comprise at least two of the UUID, Major, and Minor, of the Bluetooth signal;
   wherein the UUID represents a first location, the Major represents a second location within the first location, and the Minor represents a third location within the second location;
   estimating one or more distances between a second receiver and one or more of the plurality of electrical wall socket devices; and
   approximating a location of the second receiver in the room based on the estimated one or more distances.

17. The method of claim 16, wherein the receiver located in the room receives the plurality of radio signals.

18. The method of claim 16, wherein the estimating is based on a plurality of signal strengths of the plurality of radio signals.

19. The method of claim 16, wherein the receiver comprises a processor that processes the estimating and approximating.

20. A system for approximating a spatial position of a receiver in an indoor environment, comprising:
   a plurality of electrical wall socket devices that broadcast a plurality of one-way communications,
   wherein the plurality of wall sockets are configured to receive respective configuration information, wherein the configuration information comprises at least two of a UUID, Major, and Minor of a Bluetooth Low Energy signal;
   wherein the one-way communications comprise at least two of the UUID, Major, and Minor, of the Bluetooth signal;
   wherein the UUID represents a first location, the Major represents a second location within the first location, and the Minor represents a third location within the second location; and
   a receiver located in a room that receives a plurality of radio signals; and a processor that approximates a spatial position of the receiver based on the received radio signals.

* * * * *